United States Patent
Nakamura

(10) Patent No.: US 6,719,435 B2
(45) Date of Patent: Apr. 13, 2004

(54) DC-DC CONVERTER WITH REDUCED INPUT CURRENT RIPPLES

(75) Inventor: Toshiaki Nakamura, Kadoma (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 10/181,199

(22) PCT Filed: Nov. 13, 2001

(86) PCT No.: PCT/JP01/09894

§ 371 (c)(1),
(2), (4) Date: Jul. 15, 2002

(87) PCT Pub. No.: WO02/41481

PCT Pub. Date: May 23, 2002

(65) Prior Publication Data

US 2003/0002300 A1 Jan. 2, 2003

(30) Foreign Application Priority Data

Nov. 15, 2000 (JP) .......................... 2000-348758

(51) Int. Cl.⁷ .......................... H02M 3/335; H02M 3/24
(52) U.S. Cl. ........................................ 362/21.18; 363/97
(58) Field of Search .............................. 363/21.18, 21.01, 363/21.02, 21.17, 97, 98, 21.04, 21.12, 79, 80, 16, 40, 20

(56) References Cited

U.S. PATENT DOCUMENTS

| | | | | |
|---|---|---|---|---|
| 3,697,854 | A | * | 10/1972 | Berger ..................... 363/21.18 |
| 4,184,197 | A | * | 1/1980 | Cuk et al. ..................... 363/16 |
| 4,316,242 | A | * | 2/1982 | Colangelo et al. ............ 363/80 |
| 5,910,712 | A | * | 6/1999 | Toyma ......................... 315/307 |
| 6,069,807 | A | * | 5/2000 | Boylan et al. ................ 363/97 |
| 6,087,782 | A | * | 7/2000 | Majid et al. ................. 315/224 |

FOREIGN PATENT DOCUMENTS

| JP | 56-30715 | * | 3/1981 |
|---|---|---|---|
| JP | 56-52738 | | 5/1981 |
| JP | 4-133658 | | 5/1992 |
| JP | 6-38524 | | 2/1994 |
| JP | 7-245945 | | 9/1995 |
| JP | 9-271172 | | 10/1997 |
| JP | 10-162986 | | 6/1998 |

OTHER PUBLICATIONS

Patent Abstracts of Japan; Publication No. 56052738, published May 12, 1981.
Patent Abstracts of Japan; publications No. 04133658, published May 7, 1992.
Patent Abstracts of Japan, publication No. 07245945, published Sep. 19, 1995.
Patent Abstracts of Japan, publication No. 06038524, published Feb. 10, 1994.
Patent Abstracts of Japan, publication No. 10162986, published Jun. 19, 1998.
Patent Abstracts of Japan, publication No. 09271172, published Oct. 14, 1997.
Patent Abstracts of Japan, publication No. 56030715, published Mar. 27, 1981.

* cited by examiner

Primary Examiner—Rajnikant B Patel
(74) Attorney, Agent, or Firm—Rosenthal & Osha L.L.P.

(57) ABSTRACT

An improved DC-DC converter with reduced input current ripples. The converter includes a transformer, a switch, and a capacitor. The switch turns on and off alternately to store the energy in the transformer. The capacitor is connected in series with a rectifier and a secondary winding of the transformer across an input DC voltage so as to be charged by the energy released from the secondary winding through the DC power source. Accordingly, the circuit sees an input current which continues flowing through the DC power source even the switching element is turned off.

10 Claims, 9 Drawing Sheets

DC-DC CONVERTER WITH REDUCED INPUT CURRENT RIPPLES

TECHNICAL FIELD

The present invention relates to a DC-DC converter, and more particularly to the DC-DC converter capable of reducing input current ripples for improving circuit efficiency.

BACKGROUND ART

U.S. Pat. No. 5,910,712 discloses a DC-DC converter of the type known as a fly-back converter which includes a transformer with a primary winding connected in series with a switching element across an input DC power source and a secondary winding connected across a smoothing output capacitor that is responsible for supplying an output DC voltage to a load. In operation, the switching element is controlled to turn on and off for repetitively interrupting the input DC voltage supplied to the primary winding so as to accumulate the energy in the primary winding when the switching element is on and release the corresponding energy from the secondary winding to charge the smoothing output capacitor when the switching element is off, thereby providing a smoothed DC output voltage to the load. Thus, it is possible to set the output DC voltage at a desired level even lower than the input DC voltage by selecting a duty cycle of the switching element.

This circuit, however, permits no input current being supplied from the input DC power source while the switching element is off, thereby suffering from increased input current ripples. The increased ripples results in lowering the circuit efficiency as well as corresponding increased input current peak which necessitates a large capacity for the transformer with attendant increase in the bulk of the transformer. Also, since the transformer in this circuit is alone responsible for conveying the energy from the input DC power source to the load, the transformer has to include a relatively large core in order to prevent magnetic flux saturation and is therefore made into a large bulk. Thus, it is difficult to use the transformer of compact design and to assemble the whole circuit into a compact sufficient to be installed within a limited space.

DISCLOSURE OF THE INVENTION

In view of the above insufficiency, the present invention has been accomplished to provide an improved DC-DC converter with reduced input current ripples which is capable of utilizing a compact transformer for reducing the physical dimensions of the converter, as well as to provide a ballast for a discharge lamp making the use of the compact DC-DC converter. The DC-DC converter in accordance with the present invention has a converter input which is adapted to receive an input DC voltage, and a converter output which is adapted to be connected to a load for proving an output DC voltage to the load. The converter includes a transformer having a primary winding and a secondary winding. The primary winding is connected in series with a switching element across the converter input. The switching element is driven to turn on and off in order to repetitively interrupt the DC input voltage and induce an energy at the secondary winding in response to the switching element being turned off. A capacitor is connected in circuit to be charged by the energy released from the secondary winding so as to accumulate the output DC voltage, and is connected across the converter output to provide the resulting output DC voltage to the load.

The characterizing feature of the present invention resides in that the capacitor is connected in series with a rectifier and the secondary winding so as to be charged by the energy released from the secondary winding through the converter input. With this arrangement, the circuit sees an input current which continues flowing through the converter input even while the switching element is turned off. Thus, no interruption in the input DC current is assured to thereby reduce the input current ripples and therefore the input current peak which enables the use of small-sized transformer for overall compact arrangement of the converter, yet improving the circuit efficiency.

A controller is included in the converter to determine a switching frequency of the switching element that is sufficiently higher than a resonance frequency given to a resonant system given by the capacitor and the secondary winding in order to restrain undesirable resonance for reliable converter operation.

In one embodiment of the present invention, the capacitor is connected in series with the primary winding across the DC power source so as to form a closed loop of the capacitor, the secondary winding, the rectifier, the converter input and the primary winding for flowing the input current therethrough while the switching element is off. For this purpose, the secondary winding has a polarity chosen in relation to the winding sense of the primary winding such that the input DC voltage is superimposed in phase upon the voltages induced at the first and second windings, respectively.

In another embodiment of the present invention, the capacitor is connected in series with the secondary winding and the rectifier across the DC power source in parallel with a series combination of the primary winding and the switching element. Thus, there is established a closed loop of the capacitor, the secondary winding, the rectifier and the converter input for flowing the input current therethrough while the switching element is off. To this end, the secondary winding has a polarity chosen in relation to the winding sense of the primary winding such that the input DC voltage is superimposed in phase upon the voltage induced at the secondary winding. Alternatively, the secondary winding may have a polarity chosen in relation to the winding sense of the primary winding such that the input DC voltage is superimposed in reverse phase upon the voltage induced at the secondary winding.

Preferably, a low-pass filter is connected across the converter output in order to remove output ripples.

The DC-DC converter can be best applied to a ballast for a discharge lamp in which an inverter is connected to convert the output DC voltage from the converter into an AC voltage for operating the discharge lamp.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 1:
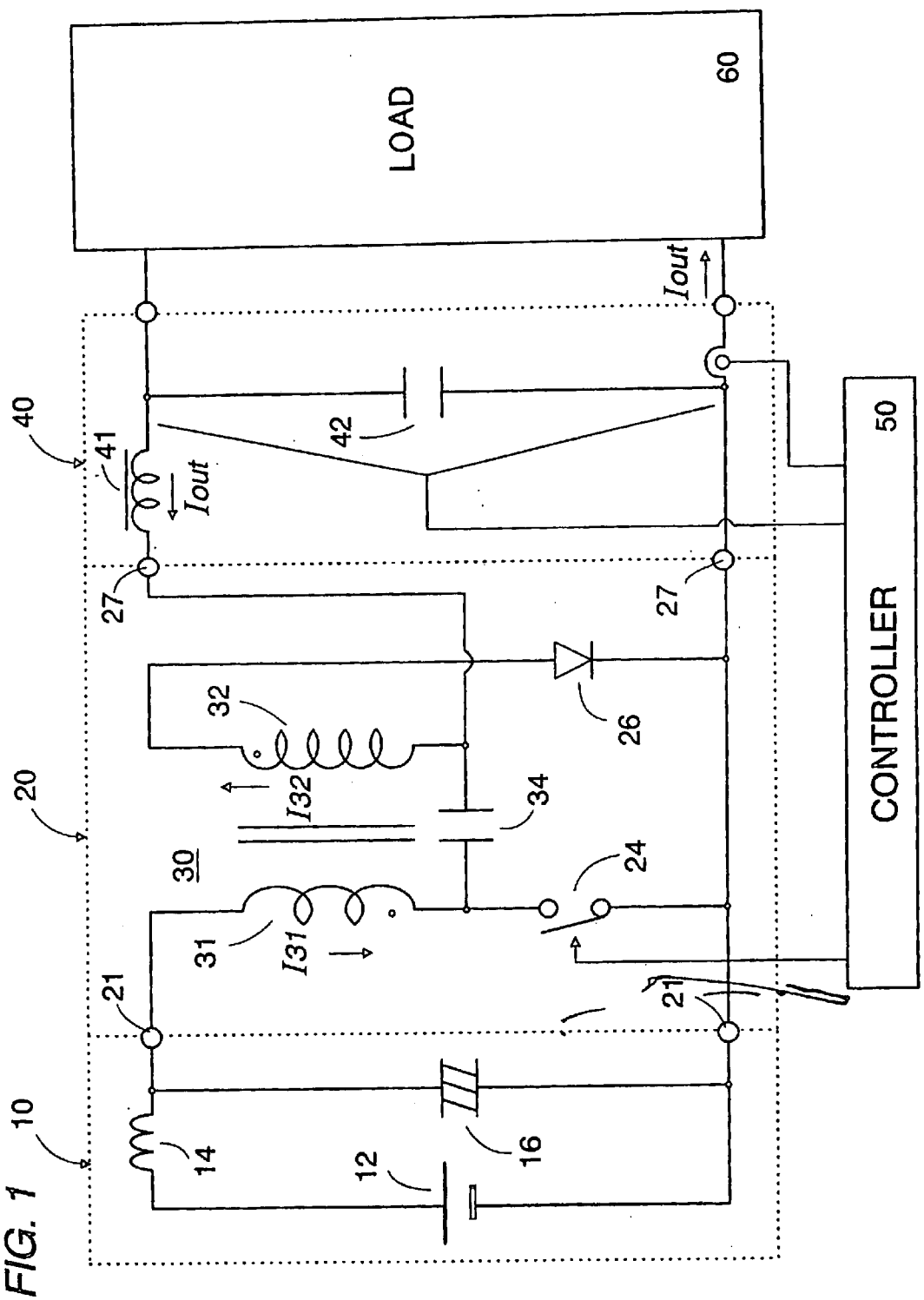
FIG. 1 is a circuit diagram of a DC-DC converter in accordance with a first embodiment of the present invention.

The preferred embodiments will now be described with reference to the accompanying drawings, wherein like reference numerals designate corresponding or identical elements throughout the various drawings.

Referring now to FIG. 1, there is shown a DC-DC converter in accordance with a first embodiment of the present invention. A converter 20 is adapted to be connected to a DC power source 10 to be supplied with an input DC voltage therefrom and provides a regulated output DC voltage to energize a load 60. Although the illustrated embodiment shows the DC power source 10 which includes a battery 12 and an input filter composed of an inductor 14 and a capacitor 16, the converter can be applied to various DC power sources of different configurations. The converter 20 includes a transformer 30 having a primary winding 31 which is connected in series with a switching element 24 (e.g. transistor) across input terminals 21, and a secondary winding 32 which gives antipolarity to the primary winding and is connected in series with a rectifier, i.e., diode 26 in a forward bias relation across output terminals 27. A smoothing output capacitor 34 is connected in series with the primary winding 31, the secondary winding 32, and the diode 26 across the input terminals 21 with the capacitor 34 connected between the windings 31 and 32. Connected between the output terminals 27 of the converter 20 and the load 60 is a low-pass filter 40 composed of an inductor 41 and a capacitor 42. The switching element 24 is driven by a controller 50 to turn on and off at a high frequency of, for example, 20 kHz or more, and at a variable duty cycle based upon a detected voltage across the load 60 and a detected load current I out in order to provide a constant output DC voltage to the load 60.

Figure 2A:
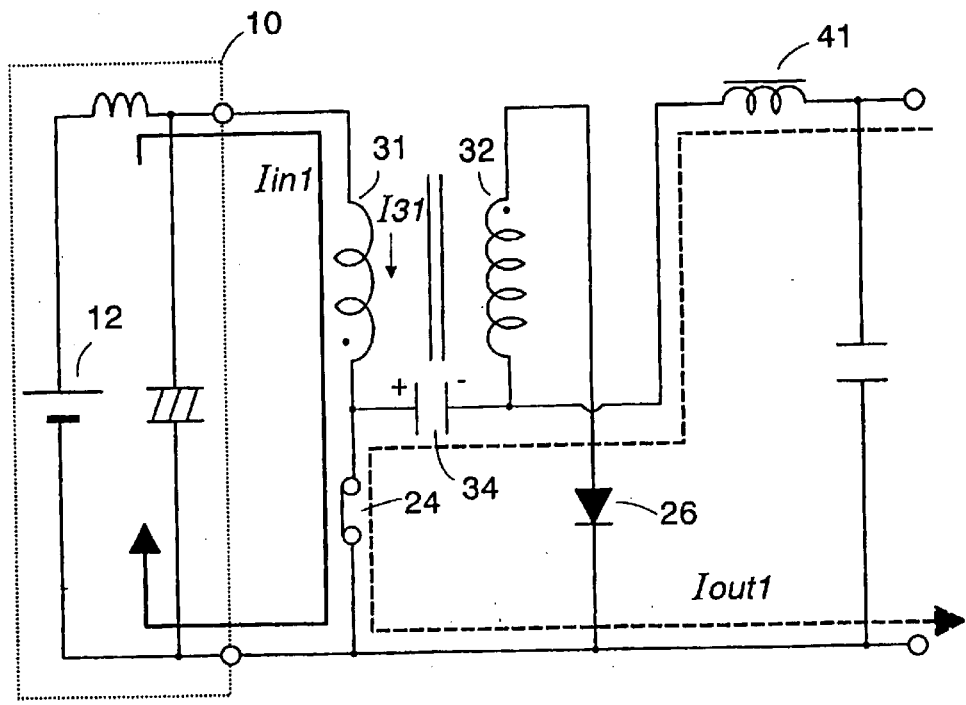
FIGS. 2A and 2B are diagram illustrating the operation of the converter.

In operation, when the switching element 24 is on, an input current Iin1 is drawn from the DC power source 10 to flow through the primary winding 31 of the transformer 30, as indicated by an arrowed solid line in FIG. 2A, so as to store the energy thereat. Upon subsequent turn off of the switching element 24, the transformer 30 releases its energy to flow an input current Iin2 through a closed loop of the secondary winding 32, diode 26, DC power source 10, primary winding 31, and capacitor 34, as indicated by an arrowed solid line in FIG. 2B, so as to charge the smoothing output capacitor 34. The current Iin2 includes a current drawn from the DC power source 10 so as to give no interruption in the input current from the DC power source while the switching element is off, thereby reducing the input current ripples and therefore the current peak. When the switching element is subsequently on, the smoothing output capacitor 34 discharges to flow an output current Iout1 through the switching element 24, as indicated by an arrowed broken line in FIG. 2A, for energizing the load. In this sense, the smoothing output capacitor 34 can be defined as an output capacitor which provides the output DC voltage to the load when the switching element 24 is on. When the switching element is off, the load is continuously supplied with an output current Iout2 which is released from the secondary winding 32 to flow through the diode 26, as indicated by an arrowed broken line in FIG. 2B. As indicated by dots in the figures, the secondary winding 32 has a winding sense in relation to the primary winding 31 such that the input DC voltage from the DC voltage source is superimposed in phase upon the voltages of the primary and secondary windings 31 and 32 when the switching element 24 is off.

Figure 3:
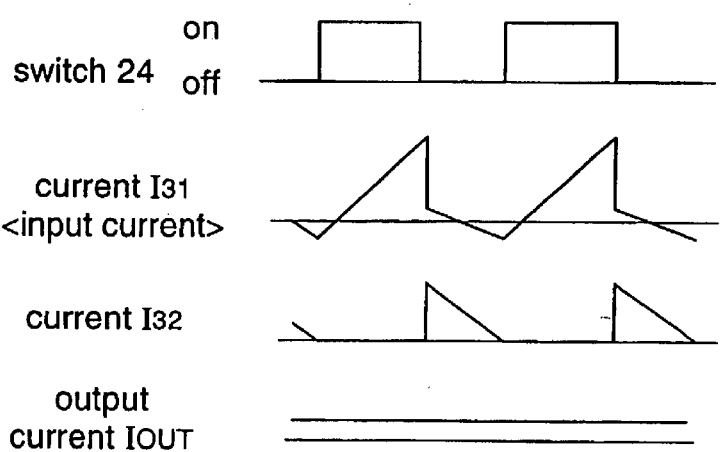
FIG. 3 is a waveform chart explaining the operation of the converter.

FIG. 3 shows various currents flowing through the circuit of the converter which demonstrates the above circuit operations. In this figure, an input current, which is a combination of currents Iin1 and Iin2, is expressed by a current I31 flowing through the primary winding 31, while the output current Iout is a combination of the currents Iout1 and Iout2 flowing through the inductor 41. Current I32 denotes a current flowing through the secondary winding 32.

Figure 2B:
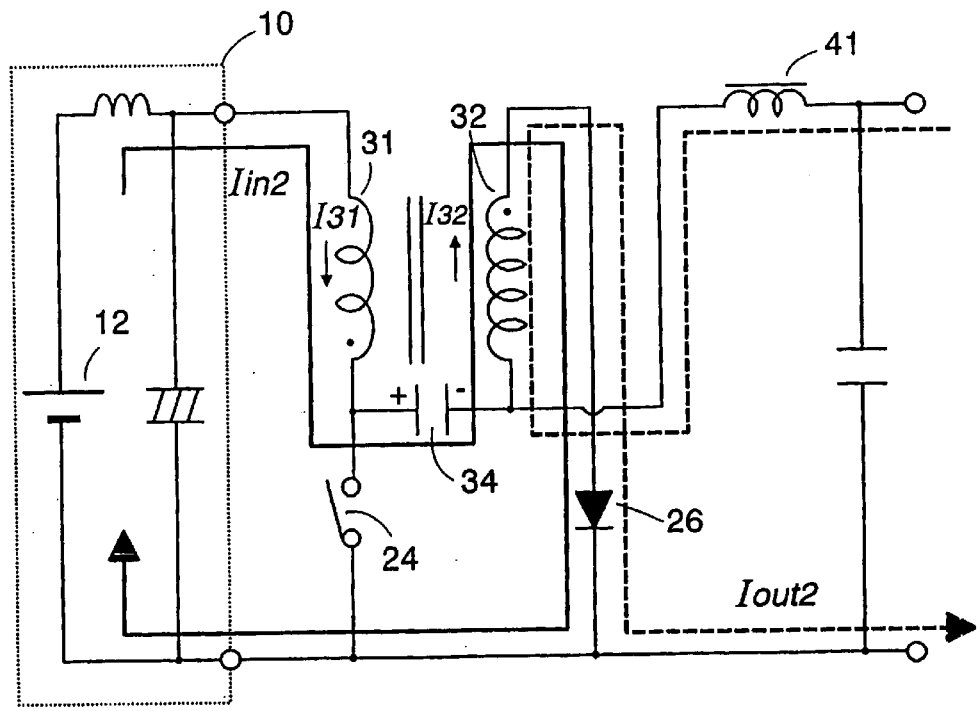

As explained in the above, the input current is continuously fed from the DC power source 10 irrespectively of the on/off condition of the switching element 24, the converter can successfully reduce the input current ripples and therefore the input current peak. This reduces a power requirement to the transformer 30 and therefore makes it possible to use the transformer of a compact size. In addition, since the primary winding 31 is connected in series with the secondary winding 32 and is cooperative therewith to charge the smoothing output capacitor 34 when the switching element is off, as shown in FIG. 2B, the number of turns of the primary winding 31 is additive to that of the secondary winding 32 in the function of charging the smoothing output capacitor 34. This means that the secondary winding 32 can be made to have reduced number of turns by the corresponding number of turns of the primary winding. With this result, the transformer can be further made compact as compared to a case in which the secondary winding is alone for charging the capacitor 34. In addition, the reduced current ripple makes it possible to use the capacitor 34 of less capacitance while retaining the intended function, thereby assisting to make the whole assembly compact.

Figure 4:
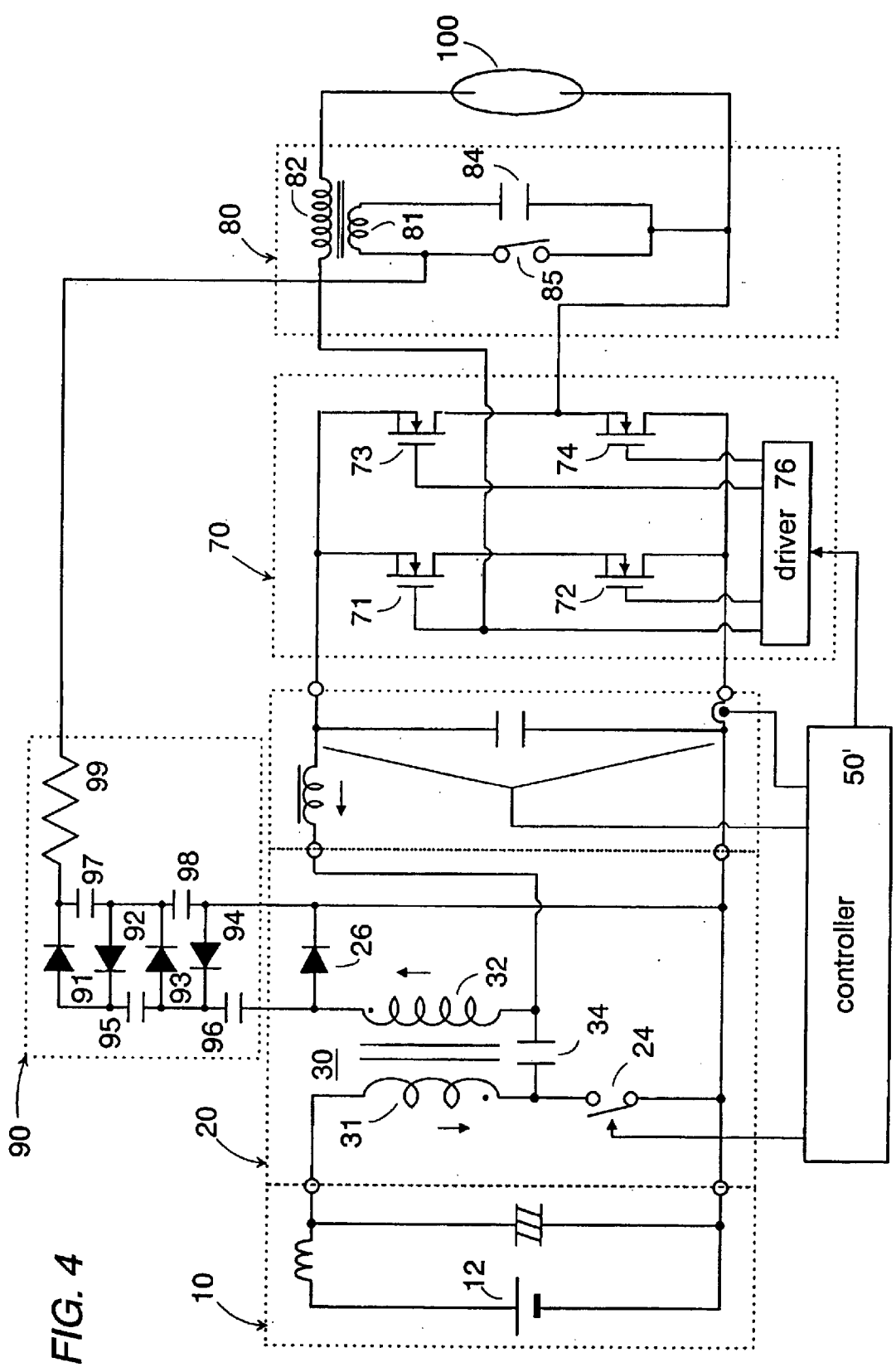
FIG. 4 is a circuit diagram of a ballast for a discharge lamp incorporating the above converter and an inverter.

FIG. 4 shows a ballast for a discharge lamp as one typical application of the DC-DC converter with the load being configured to include an inverter 70 providing a low frequency AC voltage of 1 kHz or less for operating the lamp 100, and a starter 80 providing a high starting voltage of 20 kV or more to the lamp. The inverter 70 has four switching transistors 71 to 74 arranged in the form of a full-bridge connection. The transistors are driven by a driver 76 such that a diagonally opposed pair of transistors 71 and 74 are simultaneously turned on and off in an alternate relation to the other pair of transistors 72 and 73, thus converting the output DC voltage from the converter into the AC voltage being applied to the lamp 100. The driver 76 is connected to receive a low frequency control signal of 1 kHz or less from the controller 50' to make the low frequency inverter output. The starter 80 includes a transformer with a primary winding 81 and a secondary winding 82 which is connected in series with the lamp 100 in a path of feeding the inverter output.

Connected across the primary winding 81 is a series combination of a capacitor 84 and a switch 85 which is responsible for discharging the capacitor 84 so to induce the high starting voltage at the secondary winding 82 for applying it to start the lamp.

The capacitor 84 is charged by a booster 90 which makes the use of a voltage appearing in the secondary winding 32 to provide a boosted DC voltage sufficient for rapidly charging the capacitor 84. The booster 90 is configured as a Cockcroft rectifier composed of diodes 91 to 94, capacitors 95 to 98, and a resistor 99. The booster 90 has its input connected across the diode 26 of the converter 20 and generates the boosted DC voltage from the voltage across the diode 26.

Figure 5:
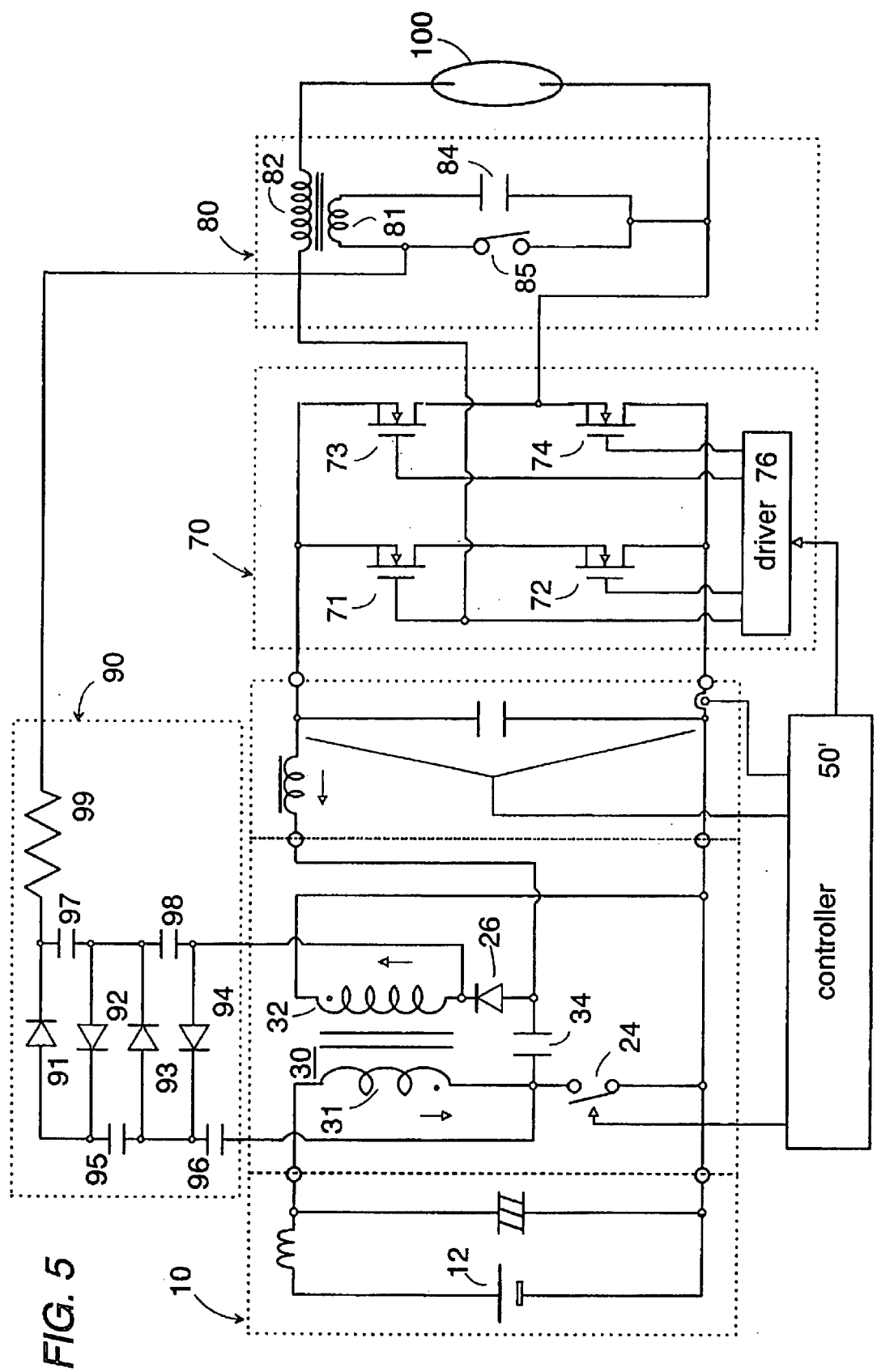
FIG. 5 is a circuit diagram of another ballast for a discharge lamp incorporating a modified converter and the like inverter.

FIG. 5 shows another ballast which is identical to that of FIG. 4 except that the converter 20 is somewhat modified such that the booster 90 derives a voltage appearing across a series combination of the capacitor 24 and the diode 26. In this connection, the diode 26 is connected in series between the secondary winding 32 and the smoothing output capacitor 34, while the converter 20 retains the same operations as discussed in the above. Like parts are designated by like numerals for an easy reference purpose.

Figure 6:
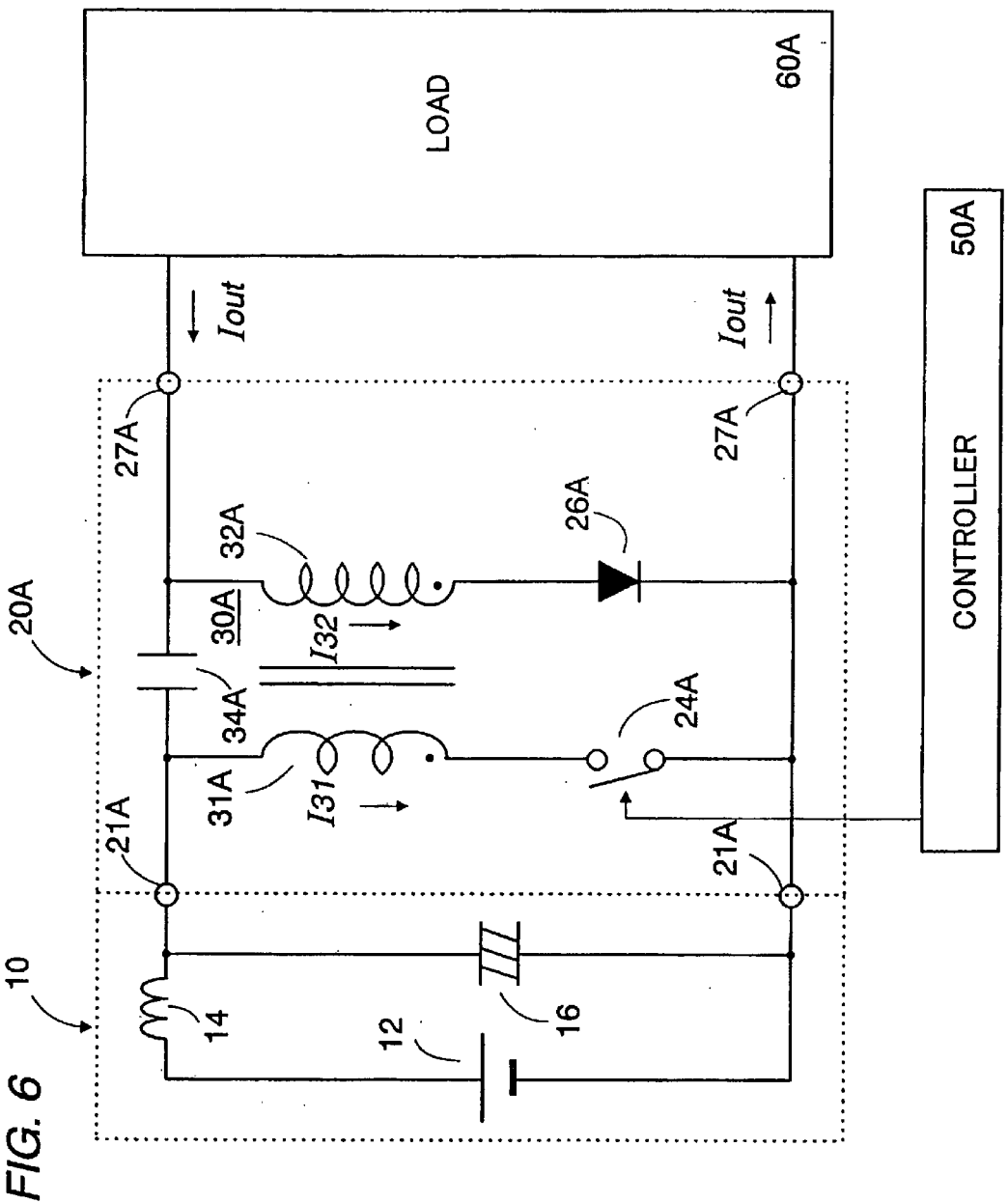
FIG. 6 is a circuit diagram of a DC-DC converter in accordance with a second embodiment of the present invention.

FIG. 6 shows a DC-DC converter 20A in accordance with a second embodiment of the present invention which is similar to the first embodiment except that the smoothing output capacitor 34A is connected in series with the secondary winding 32A and the diode 26A across the DC power source 10 in parallel relation to a series combination of the primary winding 31A and the switching element 24A. Like parts are designated by like reference numerals with a suffix letter of "A". As will be explained below, the secondary winding 32A has the same polarity as the primary winding 31A such that the input DC voltage is superimposed in phase upon the voltage of the secondary windings 32A when the switching element 24A is off.

Figure 7A:
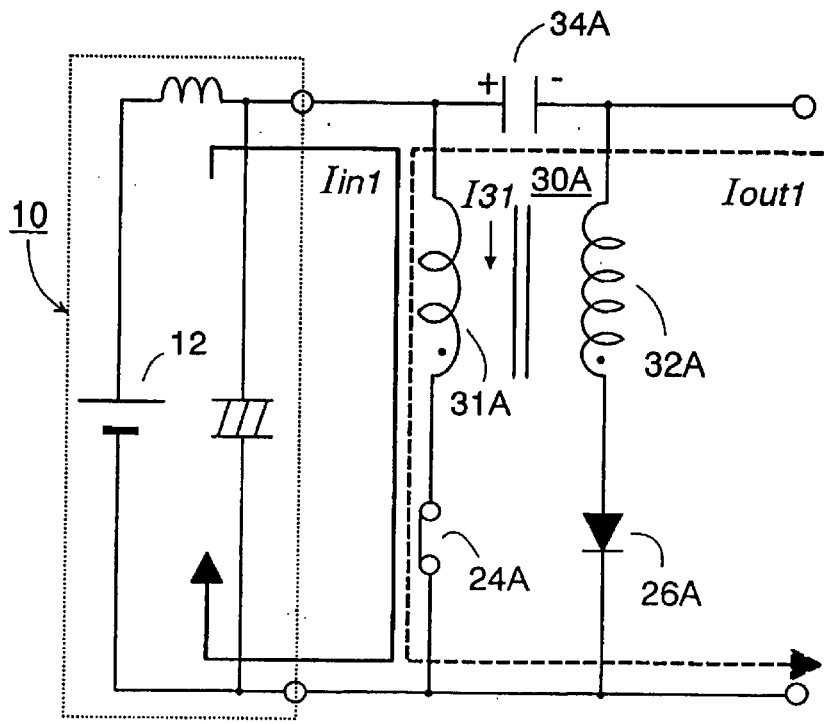
FIGS. 7A and 7B are diagram illustrating the operation of the converter.
Figure 7B:
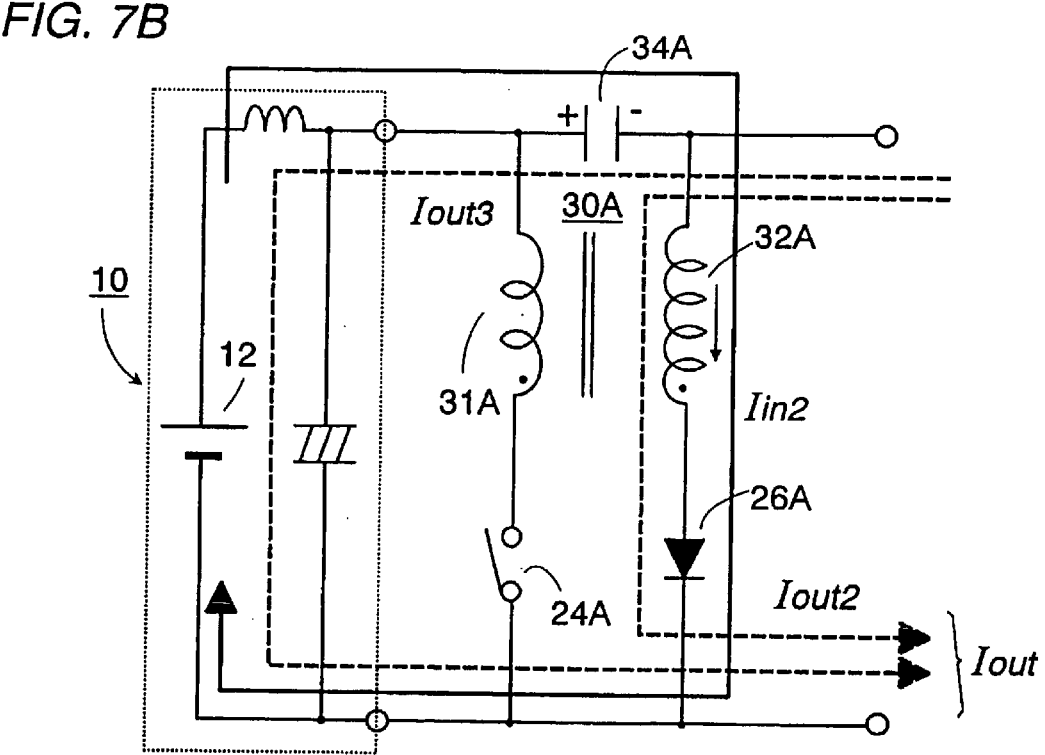

Operation of the converter is explained with reference to FIGS. 7A and 7B. When the switching element 24A is on, DC power source 10 supplies an input current Iin1 flowing through the primary winding 31A, as indicated by an arrowed solid line in FIG. 7A, to store the energy at the transformer 30A. Upon subsequent turn oft of the switching element 24A, the secondary winding 32A releases its energy to flow an output current Iout2 through the diode 26A to the load, as indicated by an arrowed broken line in FIG. 7B, while allowing an input current Iin2 to continue flow from the DC power source 10 through the smoothing output capacitor 34A, the secondary winding 32A and the diode 26A, as indicated by an arrowed solid line in the same figure, thereby charging the smoothing output capacitor 34A. Upon subsequent turn on of the switching element 24A, the smoothing output capacitor 34A thus charged is made responsible for flowing an output current Iout1 through the primary winding 31A and the switching element 24A to the load as indicated by a broken line in FIG. 7A. Also, the smoothing output capacitor 34A is responsible for flowing an output current Iout3 through the DC power source 10 to the load, as indicated another broken line, while the switching element 24A is off.

Figure 8:
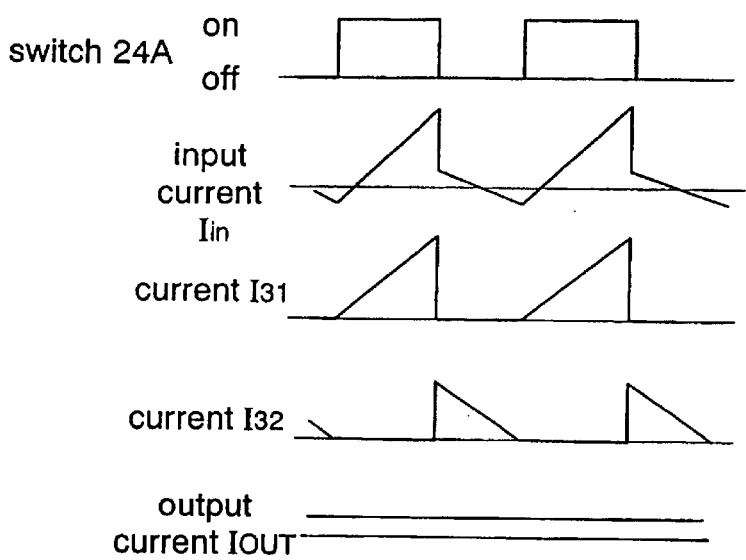
FIG. 8 is a waveform chart explaining the operation of the converter.

FIG. 8 shows various currents flowing in the circuit of the converter for demonstrating the above circuit operations. In this figure, an input current Iin1 is a combination of currents Iin1, Iin2, and Iout3, while the output current Iout is a combination of the currents Iout1, Iout2, and Iout3 supplied to the load. Currents I31 and I32 denote those flowing respectively through the primary and secondary windings 31A and 32A. As confirmed by the waveform of FIG. 8, the converter of this embodiment also assures no interruption in the input current for reducing the input current ripples as well as reducing the input current peak.

Figure 9:
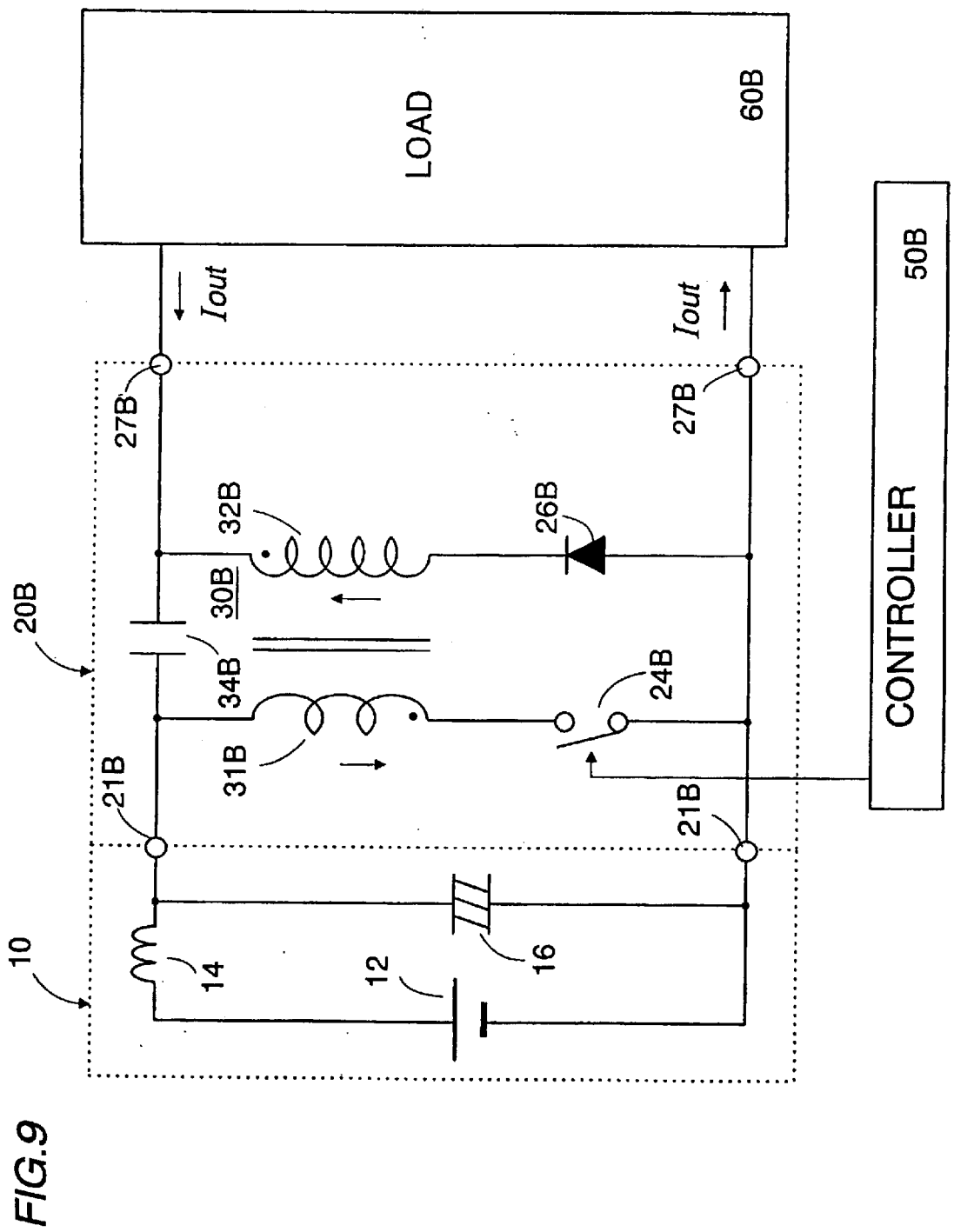
FIG. 9 is a circuit diagram of a DC-DC converter in accordance with a second embodiment of the present invention.

FIG. 9 shows a DC-DC converter 20B in accordance with a third embodiment of the present invention which is identical to the second embodiment except that the secondary winding 32B has its winding sense chosen oppositely to that of the second embodiment for flowing input and output currents through the secondary winding 32B and the diode 26B in a reverse direction. Like parts are designated by like reference numerals with a suffix letter of "B".

Figure 10A:
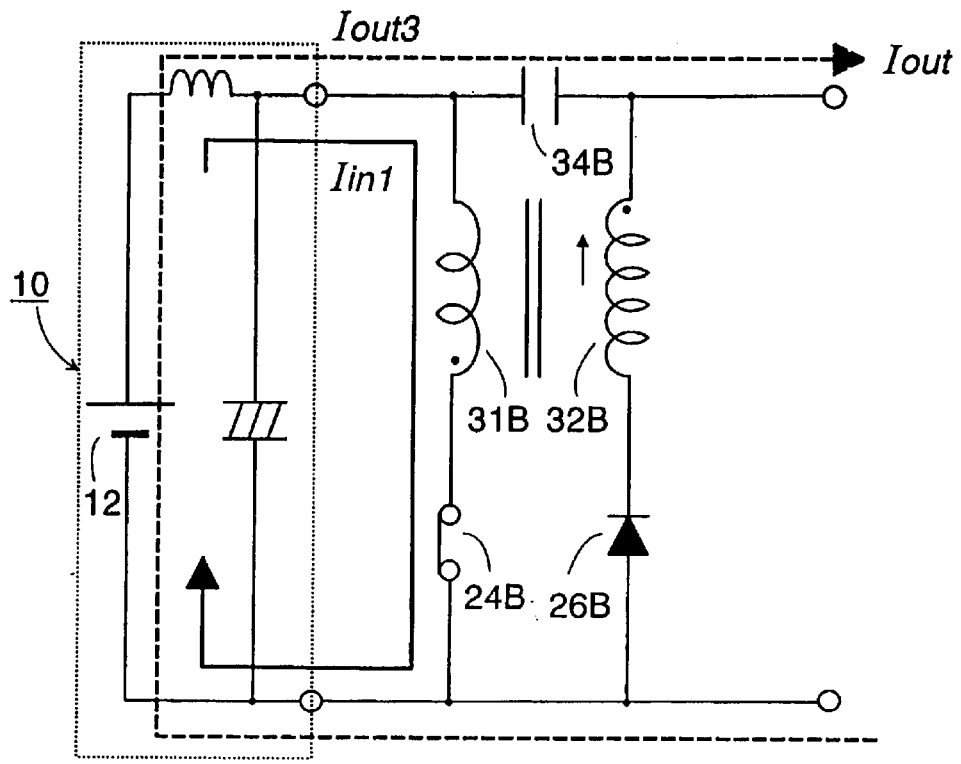
FIGS. 10A and 10B are diagram illustrating the operation of the converter.
Figure 10B:
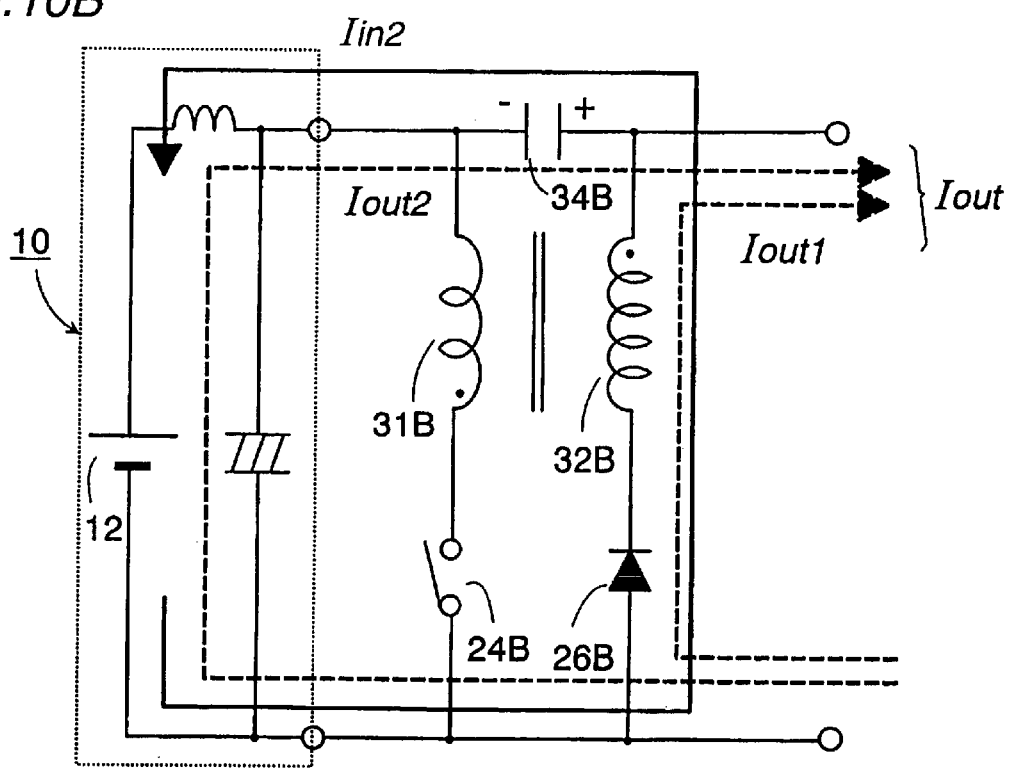

Operation of the converter is explained with reference to FIGS. 10A and 10B. When the switching element 24B is on, DC power source 10 supplies an input current Iin1 flowing through the primary winding 31B, as indicated by an arrowed solid line in FIG. 10A, to store the energy at the transformer 30B. Upon subsequent turn off of the switching element 24B, the secondary winding 32B releases its energy to flow a current Iout1 through the diode 26B to the load, as indicated by an arrowed broken line in FIG. 10B. At the same time, the smoothing output capacitor 34B is cooperative with the DC power source 10 to flow an additional current Iout2 to the load. Since the current Iout2 flows through the DC power source 10, it can be regarded as an input current which continues to flow, even in the off-period of the switching element 24B, from the DC power source 10 to the converter, thereby reducing the input current ripples and the input current peak as is made in the previous embodiment. It is noted that during the on-period of the switching element 24B, the DC power source 10 is also responsible for flowing a like current Iout3 through the smoothing output capacitor 34B to the load.

Figure 11:
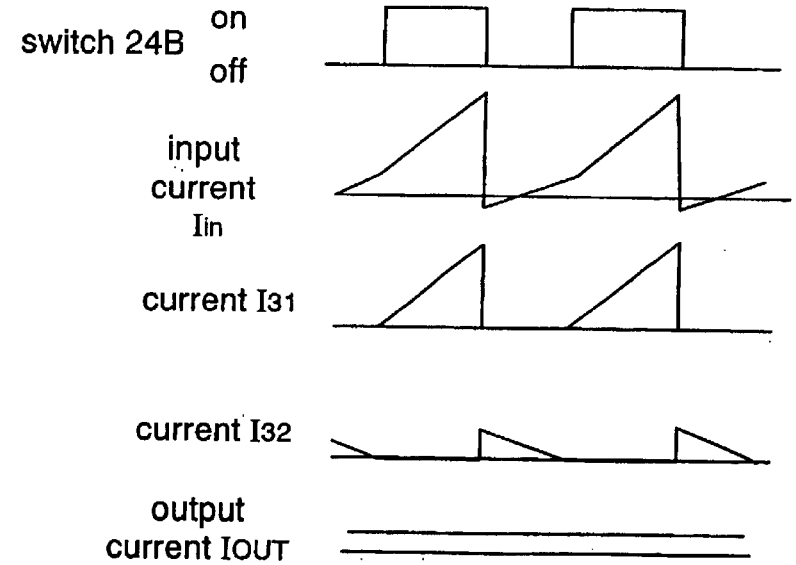
FIG. 11 is a waveform chart explaining the operation of the converter.

FIG. 11 shows various currents flowing in the circuit of the above converter 20B for demonstrating the above circuit operations. In this figure, an input current Iin1 is a combination of currents Iin1, Iin2, Iout2, and Iout3, while the output current Iout is a combination of the currents Iout1, Iout2, and Iout3 supplied to the load. Currents I31 and I32 denote those flowing respectively through the primary and secondary windings 31B and 32B. Again as confirmed by the waveform of FIG. 11, the converter of this embodiment also gives no interruption in the input current for reducing the input current ripples as well as reducing the input current peak.

This application is based upon and claims the priority of Japanese Patent Application No. 2000-348758, filed in Japan on Nov. 15, 2000, the entire contents of which are expressly incorporated by reference herein.

What is claimed is:

1. A DC-DC converter comprising:
   a converter input which is adapted to receive an input DC voltage;
   a converter output which is adapted to be connected to a load for providing an output DC voltage to said load;
   a switching element which is connected across said converter input and is driven to turn on and off;
   a transformer having a primary winding and a secondary winding, said primary winding being connected in series with said switching element across said converter input to induce an energy at said secondary winding in response to said switching element being turned off,
   a capacitor which is connected in circuit to be charged by said energy released from said secondary winding so as to accumulate said output DC voltage, and which is connected across said converter output to provide said output DC voltage to said load, wherein said capacitor is connected in series with a rectifier and said secondary winding across said converter input so as to be charged by the energy released from said secondary winding through said converter input and said rectifier, said secondary winding being connected in circuit with said capacitor such that said secondary winding, in response to said switching element being turned-off, releases its energy through said rectifier, said converter input, and said capacitor to charge said capacitor, and said secondary winding and said rectifier being connected in series across said converter output such that said secondary winding, also in response to said switching element being turned-off, releases its energy through said rectifier to provide said output DC voltage to said converter output.

2. The DC-DC converter as set forth in claim 1, further including: a controller which determines a switching frequency of said switching element that is sufficiently higher than a resonance frequency given to a resonant system given by said capacitor and said secondary winding so as to restrain the resonance.

3. The DC-DC converter as set forth in claim 1, wherein said capacitor is connected in series with said primary winding across said converter input.

4. The DC-DC converter as set forth in claim 3, wherein said secondary winding has a polarity chosen in relation to the winding sense of the primary winding such that the input DC voltage is superimposed in phase on the voltage induced at said primary and secondary windings.

5. The DC-DC converter as set forth in claim 1, wherein said capacitor is connected in series with said secondary winding and said rectifier across said converter input in parallel with a series combination of said primary winding and said switching element.

6. The DC-DC converter as set forth in claim 5, wherein said secondary winding has a polarity chosen in relation to the winding sense of the primary winding such that the input DC voltage is superimposed in phase upon the voltage induced at the secondary winding.

7. The DC-DC converter as set forth in claim 5, wherein said secondary winding has a polarity chosen in relation to the winding sense of the primary winding such that the input DC voltage is superimposed in reverse phase upon the voltage induced at the secondary winding.

8. The DC-DC converter as set forth in claim 1, wherein a filter is connected across said converter output so as to remove output ripples.

9. The DC-DC converter as set forth in claim 8, wherein said filter is a low-pass filter.

10. A ballast for a discharge lamp, said ballast being a combination of a DC-DC converter and an inverter, said DC-DC converter comprising a converter input which is adapted to receive an input DC voltage;

a converter output which is adapted to be connected to a load for providing an output DC voltage to said load;

a switching element which is connected across said converter input and is driven to turn on and off;

a transformer having a primary winding and a secondary winding, said primary winding being connected in series with said switching element across said converter input to induce an energy at said secondary winding in response to said switching element being turned off, a capacitor which is connected in circuit to be charged by said energy released from said secondary winding so as to accumulate said output DC voltage, and which is connected across said converter output to provide said output DC voltage to said load, wherein said capacitor is connected in series with a rectifier and said secondary winding across said converter input so as to be charged by the energy released from said secondary winding through said converter input and said rectifier, said inverter being connected to said converter output and converting said output DC voltage into an AC voltage for operating the discharge lamp, said secondary winding being connected in circuit with said capacitor such that said secondary winding, in response to said switching element being turned-off, releases its energy through said rectifier, said converter input, and said capacitor to charge said capacitor, and said secondary winding and said rectifier being connected in series across said converter output such that said secondary winding, also in response to said switching element being turned-off, releases its energy through said rectifier to provide said output DC voltage to said converter output.

* * * * *